United States Patent
Ogawa et al.

(10) Patent No.: US 9,211,641 B2
(45) Date of Patent: Dec. 15, 2015

(54) APPARATUS FOR CONTROLLING MOBILE ROBOT

(71) Applicant: HONDA MOTOR CO., LTD., Tokyo (JP)

(72) Inventors: Naohide Ogawa, Wako (JP); Masaki Aihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 500 days.

(21) Appl. No.: 13/890,393

(22) Filed: May 9, 2013

(65) Prior Publication Data

US 2014/0005828 A1    Jan. 2, 2014

(30) Foreign Application Priority Data

Jun. 28, 2012  (JP) ................ 2012-145690

(51) Int. Cl.
*B25J 9/16*    (2006.01)
*B25J 19/00*    (2006.01)

(52) U.S. Cl.
CPC .............. *B25J 9/1628* (2013.01); *B25J 19/005* (2013.01)

(58) Field of Classification Search
CPC ....... B25J 9/1628; B25J 19/005; B25J 9/1674
See application file for complete search history.

(56) References Cited

U.S. PATENT DOCUMENTS

| 7,642,745 B2 * | 1/2010 | Kaneko et al. ............... 320/107 |
| 8,150,551 B2 * | 4/2012 | Kaneko et al. ............... 700/258 |
| 2008/0161969 A1 * | 7/2008 | Lee et al. ..................... 700/245 |

FOREIGN PATENT DOCUMENTS

| JP | 4159711 | 10/2008 |
| JP | 4552037 | 9/2010 |

* cited by examiner

*Primary Examiner* — Nicholas Kiswanto
(74) *Attorney, Agent, or Firm* — Rankin, Hill & Clark LLP

(57) ABSTRACT

In an apparatus for controlling a mobile robot having movement mechanisms and work mechanisms both connected to a body, a battery connectable to an external power supply through a charging connector, actuators powered by the battery to drive the mechanisms, and a controller for controlling an action of the movement mechanisms and the work mechanisms through the actuators, the controller comprises a connector connection determiner to determine whether the charging connector is connected to the external power supply and an action restrictor to restrict one of the actions of the movement mechanisms and the work mechanisms performed through the actuators when the external power supply is determined to be connected.

8 Claims, 6 Drawing Sheets

APPARATUS FOR CONTROLLING MOBILE ROBOT

BACKGROUND

1. Technical Field

This invention relates to an apparatus for controlling a mobile robot, more particularly to an apparatus for controlling actions of the mobile robot during charging of a battery installed in a mobile robot.

2. Background Art

When a mobile robot is equipped with electrical actuators powered by a battery to drive movement mechanisms and the like, the battery needs to be charged (recharged) by connecting it to an external power supply through a charging connector. When the external power supply is a commercial power source, the charging connector is connected to an outlet of the commercial power source through a long cord. There is therefore a danger of the posture of the mobile robot being destabilized if the cord should catch on the robot or some nearby structure.

In light of this, there is a known technique which is to calculate the amount of rotation around the gravity axis of the mobile robot, decide a direction of rotation based on the calculated amount of rotation, and design the moving path so as to make the calculated amount of rotation zero, as taught, for example, by Japanese Patent No. 4159711 (reference 1). Another example for an automatic charger for use as an external power supply for mobile robots is taught, for example, by Japanese Patent No. 4552037 (reference 2).

SUMMARY

Being devised as described above, the technique disclosed in the reference 1 can avoid destabilization of the posture of a mobile robot. However, it assumes a charging situation in which a cord might catch on the mobile robot or a structure. It is therefore inconvenient in not being able to deal with other charging modes.

Moreover, in a mobile robot equipped with work mechanisms in addition to the movement mechanisms connected to the body, a need sometimes arises to operate only the work mechanisms with the movement mechanisms in a halted state. However, the technique of the reference 1 cannot respond to this requirement.

An object this invention is to overcome the aforesaid problem by, in a mobile robot equipped with electrical actuators powered by a battery connectable to an external power supply to drive movement mechanisms and work mechanisms, providing a mobile robot control apparatus for preventing postural destabilization and enabling response to work mechanism action requirements irrespective of charging situation.

In order to achieve the object, embodiments of this invention provides in a first aspect an apparatus for controlling a mobile robot having a body, movement mechanisms for walking operation and work mechanisms for working operation both connected to the body, a battery connectable to an external power supply through a charging connector, a plurality of actuators powered by the battery to drive the movement mechanisms and the work mechanisms, and a controller for controlling an action of the movement mechanisms and the work mechanisms through the actuators, wherein the controller comprises: a connector connection determiner that determines whether the charging connector is connected to the external power supply; and an action restrictor that restricts one of the actions of the movement mechanisms and the work mechanisms performed through the actuators when the external power supply is determined to be connected In order to achieve the object, an embodiment of this invention provides in a second aspect a method for controlling a mobile robot having a body, movement mechanisms for walking operation and work mechanisms for working operation both connected to the body, a battery connectable to an external power supply through a charging connector, a plurality of actuators powered by the battery to drive the movement mechanisms and the work mechanisms, and a controller for controlling an action of the movement mechanisms and the work mechanisms through the actuators, comprising the steps of determining whether the charging connector is connected to the external power supply; and restricting one of the actions of the movement mechanisms and the work mechanisms performed through the actuators when the external power supply is determined to be connected.

Embodiments for implementing an apparatus for controlling a mobile robot according to this invention are explained with reference to the drawings in the following.

Figure 1:
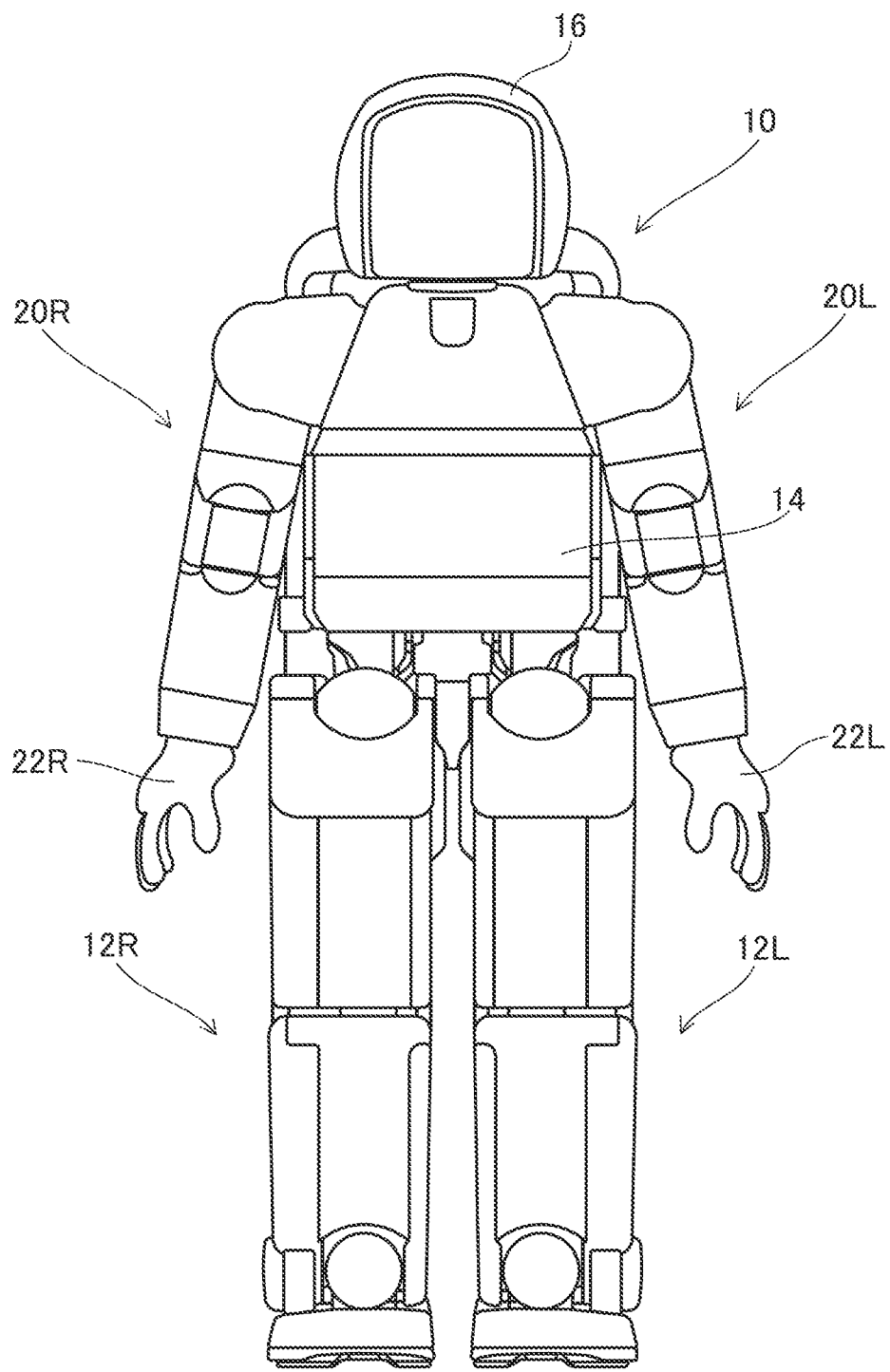
FIG. 1 is a front view of a robot on which an apparatus for controlling a mobile robot according to an embodiment of this invention is premised.
Figure 2:
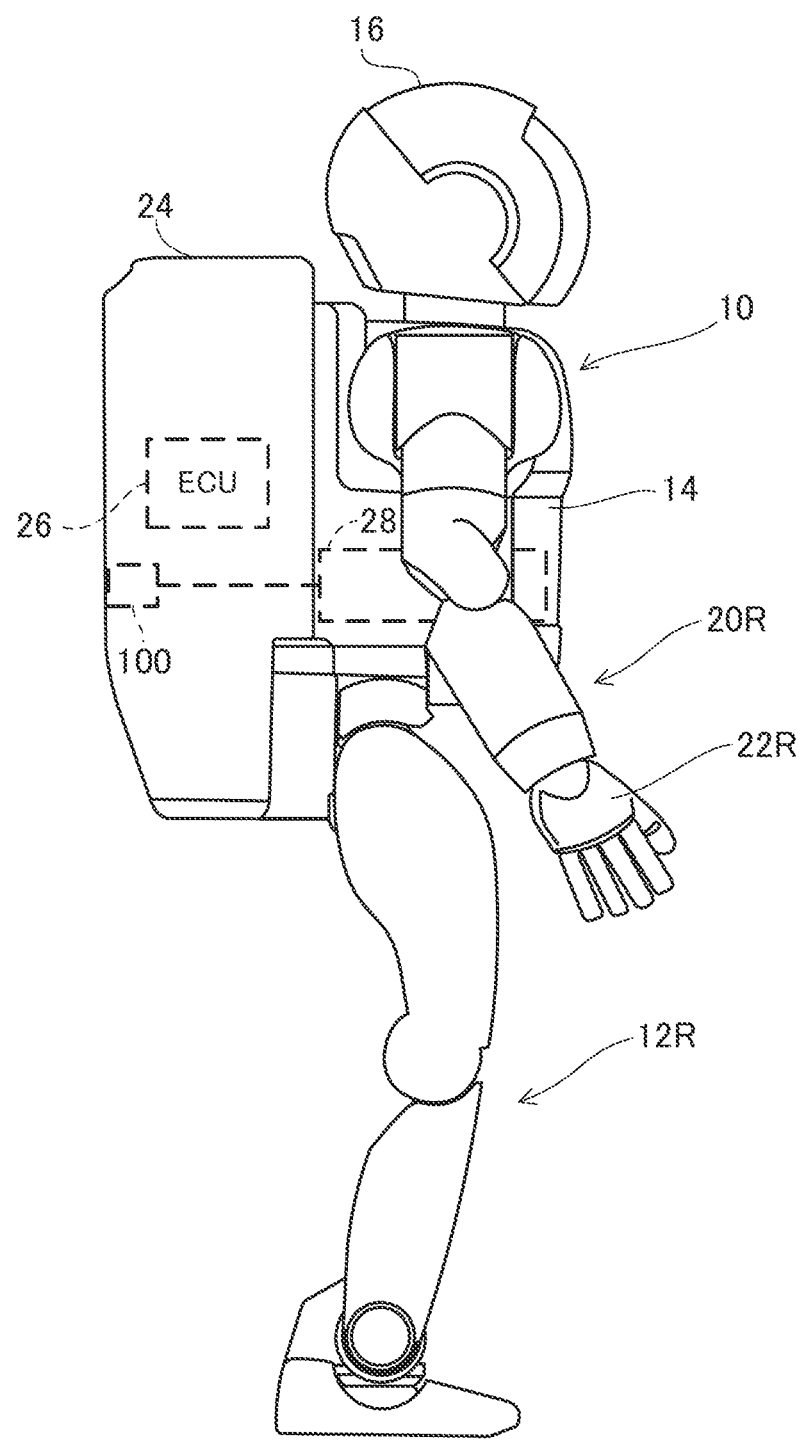
FIG. 2 is a side view of the robot shown in FIG. 1.
Figure 3:
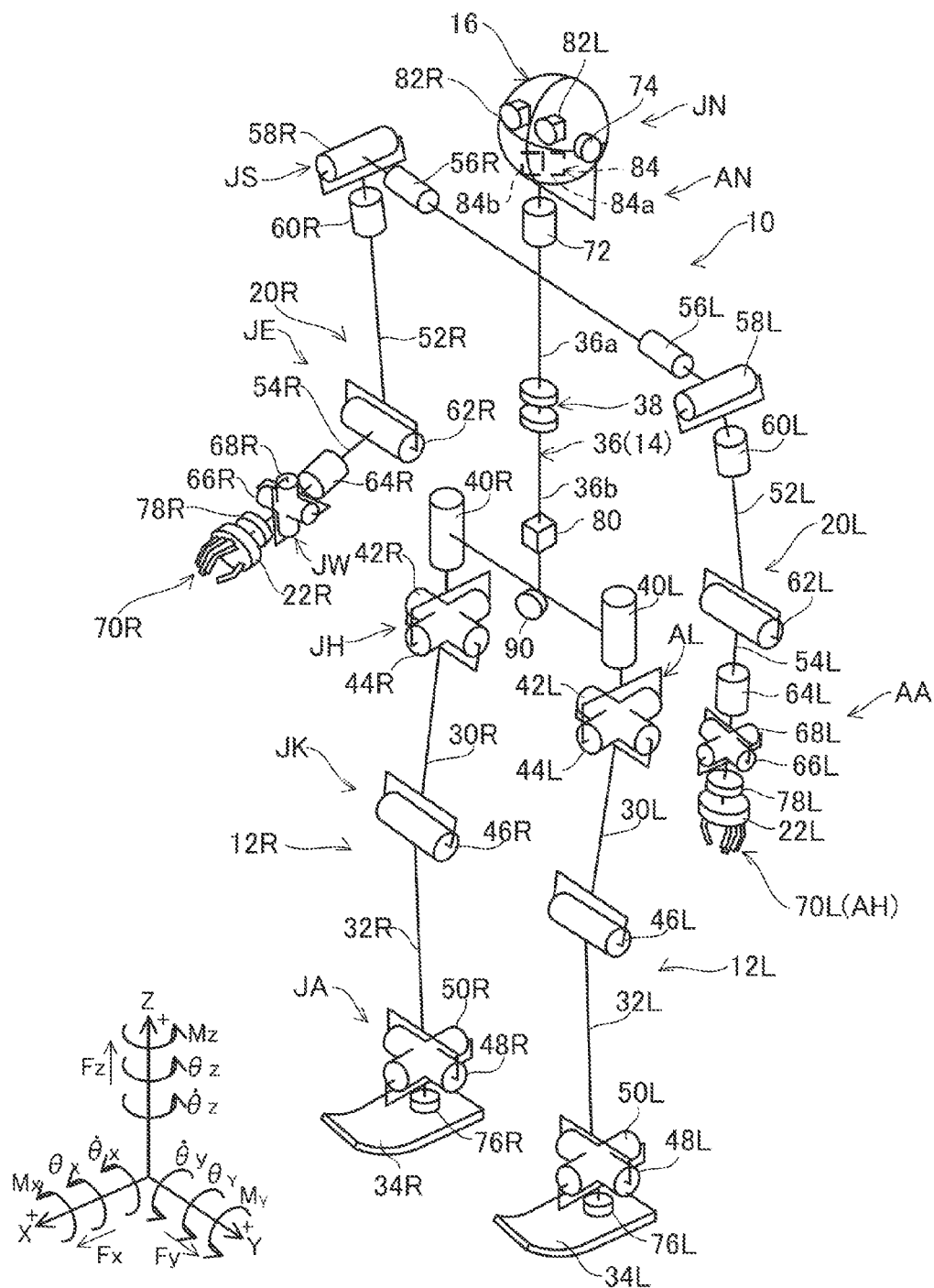
FIG. 3 is a schematic diagram showing the skeleton of the robot shown in FIG. 1.
Figure 4:
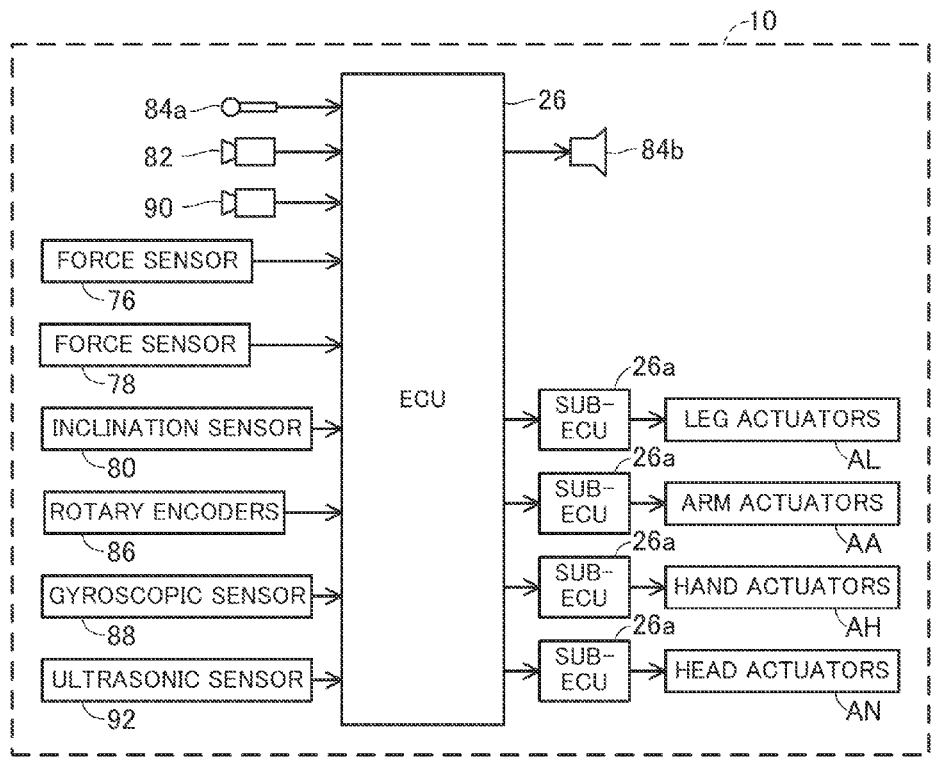
FIG. 4 is a block diagram showing input/output relations of an electronic control unit (ECU) shown in FIG. 2.

FIG. 1 is a front view of a robot on which an apparatus for controlling a mobile robot according to a first embodiment of this invention is premised; FIG. 2 is a side view of the robot shown in FIG. 1; FIG. 3 is a schematic diagram showing the skeleton of the robot shown in FIG. 1; and FIG. 4 is a block diagram showing input/output relations of an electronic control unit (ECU) installed in the robot shown in FIG. 1.

As shown in FIG. 1, a legged mobile robot (hereinafter sometimes called simply "robot") 10 is equipped with multiple (two) legs, namely with left and right legs (movement mechanisms) 12L, 12R (Here and hereinafter L and R are used to indicate left and right sides). The legs 12L, 12R are connected to the bottom of a body (trunk) 14. A head 16 is connected to the top of the body 14 and multiple (two) arms, namely left and right arms (work mechanisms) 20L, 20R are connected to opposite sides of the body 14.

Hands (end effectors) 22L, 22R are connected to the distal ends of the left and right arms 20L, 20R. In this embodiment, the mobile robot is exemplified by a humanoid legged mobile robot having two legs 12 and two arms 20 and stands to a height of approximately 1.3 m.

As shown in FIG. 2, a storage unit 24 is mounted on the back of the body 14. The storage unit 24 accommodates, inter alia, an Electronic Control Unit (ECU: controller) 26. A battery 28 is housed inside the body 14.

The internal structures of the robot 10 will be explained with reference to FIG. 3, with primary focus on the joints. Since the illustrated robot 10 is laterally symmetrical, affixation of L and R will be omitted hereinafter.

The left and right legs 12 are each equipped with a thigh link 30, a shank link 32, and a foot member 34. The thigh link 30 is connected to the body 14 through a hip (crotch) joint JH. The thigh link 30 and shank link 32 are connected through a knee joint JK, and the shank link 32 and foot member 34 are connected to through an ankle joint JA.

The body 14 is shown schematically in FIG. 3 as a body link 36. The body link 36 (body 14) comprises an upper section 36a and a lower section 36b connected through a joint 38 to be movable relative to each other, specifically to be capable of rotating or swiveling.

The aforesaid joints will be explained in terms of their electric motors (actuators). The hip joint JH comprises an electric motor 40 with a rotary shaft rotatable around a Z axis (yaw axis; gravity axis of the robot 10), an electric motor 42 with a rotary shaft rotatable around the Y axis (pitch axis; lateral axis of the robot 10), and an electric motor 44 with a rotary shaft rotatable around the X axis (roll axis; longitudinal axis of the robot 10) so as to have three degrees of freedom. Thus, the thigh link 30 is connected to the body 14 through the hip joint JH and can rotate relative to the body 14 around the X, Y and Z axes.

The knee joint JK comprises an electric motor 46 with a rotary shaft rotatable around the Y axis so as to have one degree of freedom. In other words, the thigh link 30 is connected to the shank link 32 through the knee joint JK and can rotate relative to the shank link 32 around the Y axis.

The foot (ankle) joint JA comprises an electric motor 48 with a rotary shaft rotatable around the Y axis and an electric motor 50 with a rotary shaft rotatable around the X axis so as to have two degrees of freedom. In other words, the shank link 32 is connected to the foot member 34 through the ankle joint JA and can rotate relative to the foot member 34 around the X and Y axes.

Thus, each of the left and right legs 12 has six rotary shafts (degrees of freedom) including three joints, so that overall the legs 12 have a total of twelve rotary shafts. In the following, the twelve actuators, i.e., the electric motors 40 etc., that drive the legs 12 are called the "leg actuators" and designated by a symbol AL. By controlling the operation of the leg actuators AL, desired movements are imparted to the legs 12.

The left and right arms 20 are each equipped with an upper arm link 52 and a forearm link 54. The upper arm link 52 is connected to the body 14 through a shoulder joint JS. The upper arm link 52 and forearm link 54 are connected through an elbow joint JE, and the forearm link 54 and hand 22 are connected through a wrist joint JW.

The shoulder joint JS comprises an electric motor 56 with a rotary shaft rotatable around the Y axis, an electric motor 58 with a rotary shaft rotatable around the X axis, and an electric motor 60 with a rotary shaft rotatable around the Z axis so as to have three degrees of freedom. Thus, the upper arm link 52 is connected to the body 14 through the shoulder joint JS and can rotate relative to the body 14 around the X, Y and Z axes.

The elbow joint JE comprises an electric motor 62 with a rotary shaft rotatable around the Y axis so as to have one degree of freedom. In other words, the upper arm link 52 is connected to the forearm link 54 through the elbow joint JE and can rotate relative to the forearm link 54 around the Y axis.

The wrist joint JW comprises an electric motor 64 with a rotary shaft rotatable around the Z axis, an electric motor 66 with a rotary shaft rotatable around the Y axis, and an electric motor 68 with a rotary shaft rotatable around the X axis so as to have three degrees of freedome. In other words, the forearm link 54 is connected to the hand 22 through the wrist joint JW and can rotate relative to the hand 22 around the X, Y and Z axes.

Thus, each of the left and right arms 20 has seven rotary shafts (degrees of freedom) including three joints, so that overall the arms 20 have a total of fourteen rotary shafts. In the following, the fourteen actuators, i.e., the electric motors 56 etc., that drive the arms 20 are called the "arm actuators" and designated by a symbol AA. By controlling the operation of the arm actuators AA, desired movements are imparted to the arms 20.

Each hand 22 is provided with five fingers 70. The fingers 70 are operable by a hand actuator AH (shown in FIG. 4), and by operating in coordination with movements of the arm 20 can grasp objects, point in a direction suitable for the occasion, and perform other actions.

The head 16 is connected to the body 14 through a neck joint JN. The neck joint JN comprises an electric motor 72 with a rotary shaft rotatable around the Z axis and an electric motor 74 with a rotary shaft rotatable around the Y axis so as to have two degrees of fredome. The head 16 can be faced in a desired direction by controlling the operation of head actuators AN, namely the electric motors 72 and 74.

The electric motors 40 and other motors comprising the leg actuators AL, arm actuators AA, hand actuators AH, and head actuators AN are all DC servomotors.

A force sensor (six-axis force sensor) 76 attached to each of the left and right legs 12 between the foot member 34 and ankle joint JA outputs signals representing the floor reaction force components Fx, Fy and Fz of three directions and the moment components Mx, My and Mz of three directions acting on the leg 12 from the floor. A similar force sensor 78 attached to each of the left and right arms 20 between the hand 22 and the wrist joint JW outputs signals representing external force components Fx, Fy and Fz of three directions and moment components Mx, My and Mz of three directions acting on the arm 20.

An inclination sensor 80 installed on the body 14 outputs signals indicating an inclination of the body 14 from the vertical axis, more specifically, state quantities of the body 14 such as its inclination angle and angular velocity. The head 16 is equipped with two (left and right) CCD cameras 82 for taking and outputting stereographic images of the robot 10 surroundings and with an speech input/output unit 84 comprising a microphone 84a and a speaker 84b.

As shown in FIG. 4, the electric motor 40 and other motors are individually provided with rotary encoders 86 (not shown in FIGS. 1 to 3) responsive to rotation angles to output signals proportional to the joint angles, and the body 14 is provided with gyroscopic sensors (yaw-rate sensors) 88 (not shown in FIGS. 1 to 3) for producing outputs representing the angular accelerations around the X, Y and Z axes, respectively.

As shown in FIG. 3, the body 14 is further equipped with a hip-level camera 90 that produces a near-infrared laser beam forward and downward, detects light reflected from objects on the floor, for example, and produces outputs indicating the distances to and directions of the detected objects.

As shown in FIG. 4, a number of ultrasonic sensors 92 (not shown in FIGS. 1 to 3) are arranged around the body 14. The ultrasonic sensors 92 radially emit ultrasonic signals into the surroundings and produce outputs indicating the directions, positions and distances of people and other obstacles present in the surroundings.

As shown in FIG. 4, the outputs of the sensors and the like are inputted to the ECU 26. The ECU 26 is a microcomputer including a CPU, input/output circuit, ROM, RAM, and the like, none of which are shown in the drawing. Based on the input values, the ECU 26 calculates control values (manipulated variables) as current values, and controls the operation of the leg actuators AL, arm actuators AA and the like by using drive circuits (not shown) to supply them with boosted voltages from a booster (not shown) that boosts (increases) the output of the battery 28.

The ECU 26 also functions as a control unit for controlling operation of the speech input/output unit 84, which by means of a suitable method recognizes the content of a human utterance inputted through the microphone 84a of the speech input/output unit 84, generates a response to the utterance, and utters the generated response from the speaker 84b.

Figure 5:
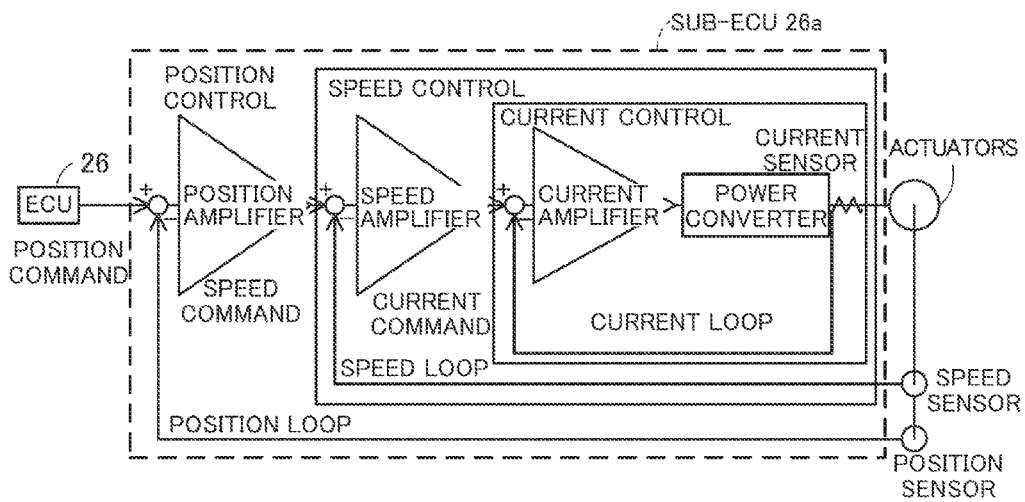
FIG. 5 is a block diagram showing the control system of the robot shown in FIG. 1.

FIG. 5 is a block diagram showing the control of the robot shown in FIG. 1.

As illustrated, the control system of this embodiment is concretely configured as a feedback control system composed of a distributed control system with a host system comprising the ECU 26 and a subordinate system comprising one or more sub-ECUs (controller) 26a deployed respectively at the leg actuators AL, arm actuators AA, hand actuators AH and head actuators AN. The ECU 26 and each of the sub-ECUs 26a can communicate with each other.

The sub-ECU 26a receives a command, more specifically a position command (desired value), from the ECU 26 and calculates a speed command by multiplying a deviation between an actual position obtained from outputs of the position sensor, i.e., outputs of the rotary encoders 86 deployed at the electric motors 40 or other associated motors, and the position command by a suitably calculated (retrieved) position gain Kp of a position amplifier. The sub-ECU 26a further calculates a current command by multiplying a deviation between an actual speed obtained from outputs of the speed sensor, i.e., outputs of the rotary encoders 86, and the calculated speed command outputted from the position amplifier by a suitably calculated speed gain Kv of a speed amplifier.

The sub-ECU 26a then calculates a control value (manipulated variable) by multiplying a deviation between actual current outputted from a power converter and detected by a current sensor (not shown in FIG. 4 etc.) and the calculated current command outputted from the speed amplifier by a suitably calculated current gain Ki of a current amplifier. As explained above, the sub-ECU 26a calculates control values using feedback control based on the commands (position command, calculated speed command, calculated current command) and detected values (actual position, actual speed, and actual current detected by sensors) and supplies them to the actuators, e.g., the electric motors 40, to control their operation.

The explanation of FIG. 2 will be resumed. A charging connector (hereinafter called "connector") 100 is installed in the storage unit 24 mounted on the back of the body 14. The connector 100 is connected to the battery 28 for charging the battery 28 by connecting it to the external power supply, for example, the commercial power source or the automatic charger. Since the external power supply is alternative current, the alternative current inputted through the connector 100 is converted to direct current having around 40 to 70V at a converter (not shown) before being supplied to the battery 28.

Figure 6:
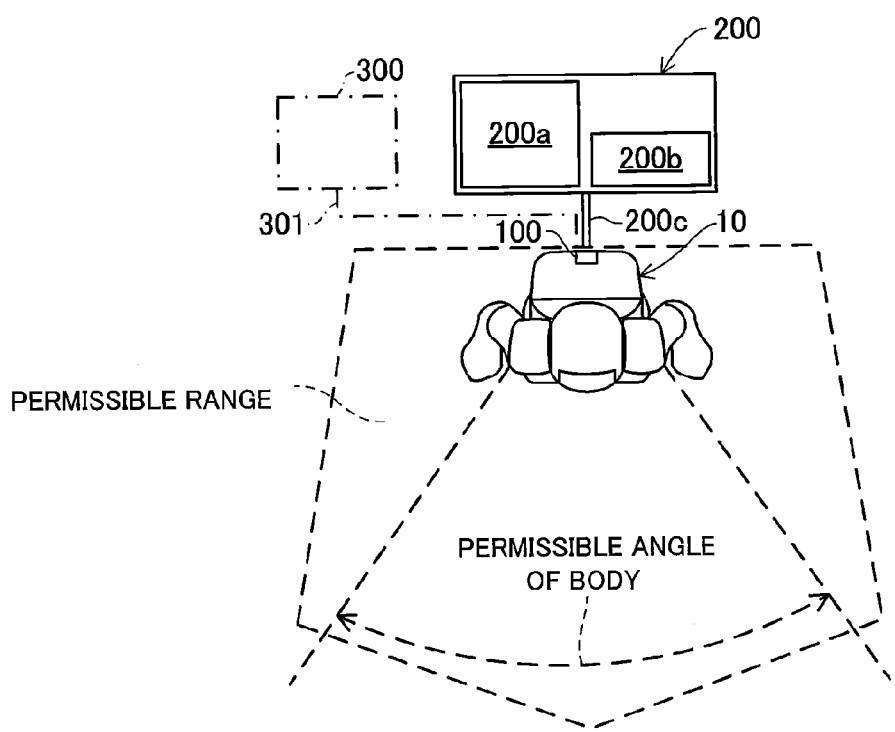
FIG. 6 is a plan view showing the mobile robot connected to and being charged by an automatic charger shown in FIG. 1.

FIG. 6 is a plan view showing the robot 10 connected to and being charged by an automatic charger 200.

The automatic charger 200 is the charger disclosed in the reference 1. It is equipped with a charging power supply 200a connected to a commercial power source through a transformer or the like to store electric power and a charging control unit (charging controller) 200b for controlling charging operation under communication with the charging power supply 200a and the ECU 26 of the robot 10.

The robot 10 approaches the automatic charger 200 by walking backward. Upon detecting the approach of the robot 10, the automatic charger 200 projects a connector 200c into connection with the connector 100 of the robot 10, whereupon the charging power supply 200a supplies charging current to the battery 28 through the connector 100.

When the robot 10 walks forward a predetermined distance away from the automatic charger 200, the connector 200c of the automatic charger 200 spontaneously detaches to automatically release the connection with the robot 10. Other particulars regarding the automatic charger 200 are disclosed in the reference 2 and are not explained here.

In the case where the external power supply is a commercial power source, gas illustrated by an imaginary line in FIG. 6, the operator manually connects the connector 100 to a commercial power source outlet 300 through a cable 301 to supply charging current to and charge the battery 28. The connection is released from the commercial power source 300 manually by the operator.

Figure 7:
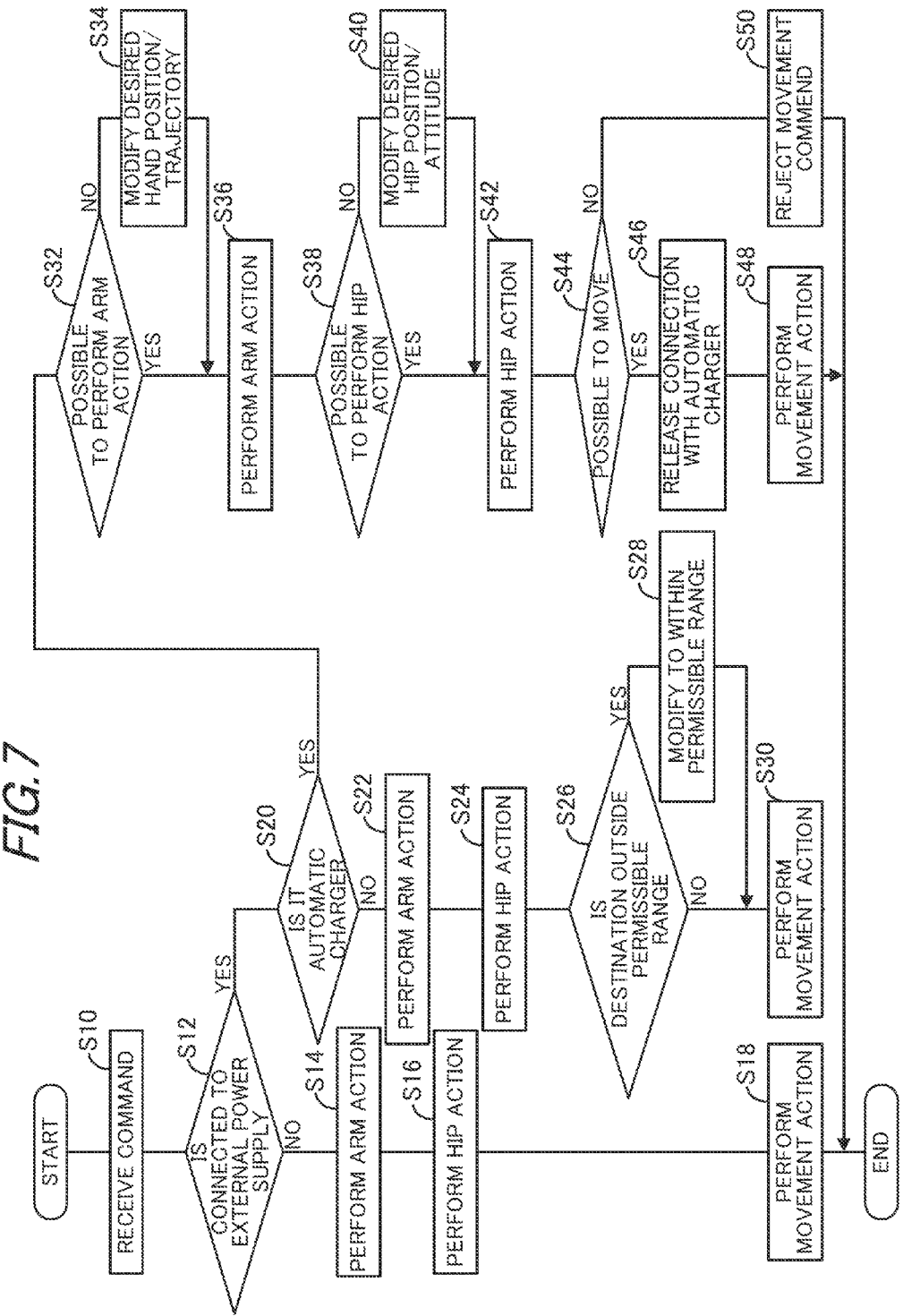
FIG. 7 is a flowchart showing operation of the apparatus for controlling the mobile robot shown in FIG. 1.

FIG. 7 is a flowchart showing operations of the apparatus for controlling the mobile robot according to this embodiment, more specifically operations of the ECU 26 and sub-ECU 26a.

The sub-ECUs 26a deployed at the leg actuators AL, inter alia, individually execute the program shown in the drawing at predetermined intervals (e.g., every 5 msec).

The flowchart is explained in the following. In S (Step: Processing Step) 10, an operation command is received from the host system ECU 26. The operation commands are created in accordance with a predefined action plan and mean processes such as indicated in S14 to S18 explained below.

Next, in S12, it is determined (decided) whether the external power supply has a connector connected, namely, whether the connector 100 is connected to the external power supply. This is determined by detecting the output of a current/voltage sensor (not shown in FIG. 4 etc.) installed in the path connecting the connector 100 and battery 28.

When the result in S12 in negative, meaning that actions are not subject to restriction because the connector 100 is not connected to the external power supply, the program proceeds to S14, in which actions of the arm actuators AA are controlled to perform the arm actions requested by the command of S10.

Next, in S16, actions of the leg actuators AL are similarly controlled to perform the hip (position corresponding to the center of the hip (crotch) joint JH at the bottom of the body 14) actions requested by the command of S10, including hip actions of rotation around the Z axis and/or movement in the X axis or Y axis direction, whereafter the program proceeds to S18, in which the leg actuators AL are similarly controlled to perform the movement actions (walking actions) requested by the command of S10.

When the result in S12 is affirmative, the program proceeds to S20, in which it is determined (decided) whether the connected external power supply is the automatic charger 200. This is determined in S20 by communicating with the ECU 26, because in the case of the automatic charger 200 the charging operation is controlled by the charging control unit 200b under communication with the ECU 26 of the robot 10.

When the result in S20 is negative, meaning that the connected external power supply is the commercial power source, the program proceeds to S22, in which actions of the arm actuators AA are controlled to perform the arm actions requested by the command of S10, and to S24, in which the leg actuators AL are controlled to perform the hip actions requested by the command of S10.

Next, in S26, it is determined whether the destination requested by the command of S10 is outside the range of permissible movement (permissible range), and when the result is affirmative, the program proceeds to S28, in which the destination is modified to within the permissible range, and to S30, in which the leg actuators AL are controlled to perform the movement actions requested by the command of S10 with respect to the modified destination. When the result in S26 is negative, the program proceeds to S30, in which the requested movement actions are performed without modification.

The reasoning in S28 is as follows. When the robot 10 is connected to the commercial power source, the connector 100 is connected to an outlet of the commercial power source by a relatively long cable, so actions of the arms 20 of the robot 10 are not restricted and movement is possible so long as within the range of the distance permitted by the cable. Therefore, in S28 it is determined whether the requested destination is outside the permissible range.

When the connector 100 is thus determined to be connected to the commercial power source in S20 and the actions requested by the command of S10 are movements using the legs 12, the actions of the legs 12 are restricted to keep its destination within the permissible range.

On the other hand, when the result in S20 is affirmative, meaning that the connected external power supply is the automatic charger 200, the program proceeds to S32, in which it is determined whether arm actions can be performed.

More specifically, as shown in FIG. 6, the robot 10 is connected to the automatic charger 200 from behind, so that movement is restricted to within the permissible range shown in the drawing and hip actions are limited to the illustrated permissible angle of the body. Moreover, the desired positions/trajectories of the hands 22 connected to the arms 20 are restricted to a predetermined range when the body 14 is required to rotate around the Z axis.

Therefore, when the result in S32 is negative, the program proceeds to S34, in which the desired hand positions/trajectories are modified to within a predetermined range, and to S36, in which actions of the arm actuators AA are controlled to perform the arm actions requested by the command of S10 in the modified desired hand positions/trajectories. When the result in S32 is affirmative, the program proceeds to S36, in which arm actions requested by the command are performed without modification.

Next, in S38, for a similar reason, it is determined whether hip actions can be performed. When the result is negative, the program proceeds to S40, in which the desired hip positions/attitudes are modified to within a predetermined range. At this time, the desired positions/attitudes of the hip of the robot 10 are particularly modified so that, more specifically, the hip does not contact the automatic charger 200.

In other words, when the connector 100 is determined to be connected to the automatic charger 200 and the actions are tasks using the legs 12, actions of the legs 12 are restricted so as not to contact the automatic charger 200.

Next, in S42, actions of the leg actuators AL are controlled to perform the hip actions requested by the command of S10 in the modified desired hip positions/attitudes. When the result in S38 is affirmative, the program proceeds to S42, in which the hip actions requested by the command are performed without modification.

Next, in S44, in which it is determined whether movement is possible, i.e., whether charging is completed. This is determined by detecting the output of another current/voltage sensor (not shown in FIG. 4 etc.) installed at the battery 28.

When the result in S44 is affirmative, the program proceeds to S46, in which processing is executed to release the connection between the robot 10 and the automatic charger 200 automatically by moving the robot 10 forward and away from the automatic charger 200. Specifically, when the connector 100 is determined to be connected to the automatic charger 200 and the actions requested by the command of S10 are movements using the legs 12, the movements are permitted, thereby to release the connection between the connector 100 and the automatic charger 200.

Next, in S48, actions of the leg actuators AL are controlled to perform the movement actions requested by the command of S10. When the result in S44 is negative, the program proceeds to S50, in which the movement instructions requested by the command are rejected.

As stated above, the embodiment of this invention is configured to have an apparatus (and method) for controlling a mobile robot 10 having a body 14, movement mechanisms (legs) 12 for walking operation and work mechanisms (arms) 20 for working operation both connected to the body, a battery 28 connectable to an external power supply through a charging connector 100, a plurality of actuators (electric motors 40 . . . 50, 56 . . . 68 comprising the leg actuators AL, arm actuators AA, hand actuators AH, and head actuator AN) powered by the battery to drive the movement mechanisms and the work mechanisms, and a controller (ECU 26, sub-ECUs 26a) for controlling an action of the movement mechanisms and the work mechanisms through the actuators, wherein the controller comprises: a connector connection determiner that determines whether the charging connector is connected to the external power supply (S12); and an action restrictor that restricts one of the actions of the movement mechanisms and the work mechanisms performed through the actuators when the external power supply is determined to be connected (S20 to S50).

With this, by appropriately restricting actions of either the legs (movement mechanisms) 12 or the arms (work mechanisms) 20, the posture of the mobile robot 10 can be prevented from becoming unstable not only in a charging situation in which the cord might catch on the mobile robot 10 or a structure but in any charging situation. Moreover, actions of either the legs (movement mechanisms) 12 or the arms (work mechanisms) 20, e.g., actions of the arms (work mechanisms) 20, are appropriately restricted, i.e., are to some degree allowed, so the action requirements of the arms (work mechanisms) 20 can be met to the utmost possible.

In the apparatus (and method), the external power supply comprises at least one of a commercial power source and an automatic charger 200 having a charging controller 200b for controlling charging operation under communication with a charging power supply 200a and the controller (ECU 26, sub-ECUs 26a); the connector connection determiner determines which one of the commercial power source and the automatic charger is connected to the charging connector when the charging connector is determined to be connected to the external power supply (S12, S20); and the action restrictor restricts one of the actions of the movement mechanisms and the work mechanisms performed through the actuators based on the determination result of the connector connection determiner (S26 to S30, S32 to S36, S38 to S42, S44 to S50).

With this, by restricting actions based on which external power supply is determined, the posture of the mobile robot 10 can be reliably prevented from becoming unstable and the action requirements of the arms (work mechanisms) 20 can be even better met.

In the apparatus (and method), the action restrictor restricts the action of the movement mechanisms (legs) 12 to keep a destination of the action within a permissible range when the charging connector 100 is determined to be connected to the commercial power source and the action is movement performed by the movement mechanisms (S20, s26, S28).

With this, in addition to the foregoing effects, it is possible by restricting actions to keep destinations within the permissible range (range of permissible movement) to prevent the posture of the mobile robot 10 from becoming unstable even more reliably.

In the apparatus (and method), the action restrictor restricts the action of the movement mechanisms (legs) 12 to avoid contact with the automatic charger 200 when the charging connector 100 is determined to be connected to the automatic charger and the action is a task performed by the movement mechanisms (S38 to S40).

With this, in addition to the foregoing effects, damage to the automatic charger 200 and mobile robot 10 can be prevented.

In the apparatus (and method), the action restrictor restricts the action of the movement mechanisms (legs) 12 to release the connection between the charging connector 100 and the automatic charger 200 by permitting movement when the action is movement performed by the movement mechanisms (S44 to S48).

With this, in addition to the foregoing effects, it is possible to release the connection to the automatic charger 200 automatically without troubling the operator.

Although the embodiment was explained taking a two-legged mobile robot as an example of the mobile robot, the robot is not limited to this type and the robot can instead be, for example, having more than two-legs or a wheels type or crawling type.

Japanese Patent Application No. 2012-145690 filed on Jun. 28, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a mobile robot having a body, movement mechanisms for walking operation and work mechanisms for working operation both connected to the body, a battery connectable to an external power supply through a charging connector, a plurality of actuators powered by the battery to drive the movement mechanisms and the work mechanisms, and a controller for controlling an action of the movement mechanisms and the work mechanisms through the actuators, wherein the controller comprises:
a connector connection determiner that determines whether the charging connector is connected to the external power supply; and
an action restrictor that restricts one of the actions of the movement mechanisms and the work mechanisms performed through the actuators when the external power supply is determined to be connected, and
wherein the external power supply comprises at least one of a commercial power source and an automatic charger having a charging controller for controlling charging operation under communication with a charging power supply and the controller,
the connector connection determiner determines which one of the commercial power source and the automatic charger is connected to the charging connector when the charging connector is determined to be connected to the external power supply, and
the action restrictor restricts one of the actions of the movement mechanisms and the work mechanisms performed through the actuators based on the determination result of the connector connection determiner.

2. The apparatus according to claim 1, wherein the action restrictor restricts the action of the movement mechanisms to keep a destination of the action within a permissible range when the charging connector is determined to be connected to the commercial power source and the action is movement performed by the movement mechanisms.

3. The apparatus according to claim 1, wherein the action restrictor restricts the action of the movement mechanisms to avoid contact with the automatic charger when the charging connector is determined to be connected to the automatic charger and the action is a task performed by the movement mechanisms.

4. The apparatus according to claim 1, wherein the action restrictor restricts the action of the movement mechanisms to release the connection between the charging connector and the automatic charger by permitting movement when the action is movement performed by the movement mechanisms.

5. A method for controlling a mobile robot having a body, movement mechanisms for walking operation and work mechanisms for working operation both connected to the body, a battery connectable to an external power supply through a charging connector, a plurality of actuators powered by the battery to drive the movement mechanisms and the work mechanisms, and a controller for controlling an action of the movement mechanisms and the work mechanisms through the actuators, comprising the steps of:

determining whether the charging connector is connected to the external power supply; and
restricting one of the actions of the movement mechanisms and the work mechanisms performed through the actuators when the external power supply is determined to be connected,
wherein the external power supply comprises at least one of a commercial power source and an automatic charger having a charging controller for controlling charging operation under communication with a charging power supply and the controller, and
wherein the step of determining determines which one of the commercial power source and the automatic charger is connected to the charging connector when the charging connector is determined to be connected to the external power supply; and
the step of restricting the actions of the movement mechanisms restricts one of the actions of the movement mechanisms and the work mechanisms performed through the actuators based on the determination result of the connector connection determiner.

6. The method according to claim 5, wherein the step of restricting the action of the movement mechanisms restricts the action of the movement mechanisms to keep a destination of the action within a permissible range when the charging connector is determined to be connected to the commercial power source and the action is movement performed by the movement mechanisms.

7. The method according to claim 5, wherein the step of restricting the action of the movement mechanisms restricts the action of the movement mechanisms to avoid contact with the automatic charger when the charging connector is determined to be connected to the automatic charger and the action is a task performed by the movement mechanisms.

8. The method according to claim 5, wherein the step of restricting the action of the movement mechanisms restricts the action of the movement mechanisms to release the connection between the charging connector and the automatic charger by permitting movement when the action is movement performed by the movement mechanisms.

* * * * *